United States Patent [19]

Wilson

[11] 3,778,252

[45] Dec. 11, 1973

[54] PROCESS FOR SEPARATION AND RECOVERY OF GOLD

[75] Inventor: Harold W. Wilson, El Paso, Tex.

[73] Assignee: The Golden Cycle Corporation, Victor, Colo.

[22] Filed: Feb. 12, 1970

[21] Appl. No.: 11,011

[52] U.S. Cl. ................. 75/101 R, 75/102, 75/109, 75/118
[51] Int. Cl. .................. C22b 3/00, C22b 11/04
[58] Field of Search ................ 75/118, 121, 101 R, 75/101 BE, 102, 109, 83, 100; 23/312 R; 260/429 J

[56] References Cited
UNITED STATES PATENTS

| | | | |
|---|---|---|---|
| 2,304,823 | 12/1942 | Harrison | 75/118 |
| 682,061 | 9/1901 | Grollet | 75/102 |
| 3,511,645 | 5/1970 | Goni | 75/101 R |
| 2,239,519 | 4/1941 | Gurwood | 75/118 X |
| 3,625,674 | 12/1971 | Jacobs | 75/118 X |

Primary Examiner—G. T. Ozaki
Attorney—Clarence A. O'Brien and Harvey B. Jacobson

[57] ABSTRACT

Processes for and compositions utilized in the recovery of the gold content of gold containing substances by subjecting such substances —preferably in comminuted form— to the action of one of the following solvent system families:

A. Aqueous gold solvation systems comprising primary or secondary mono-hydroxy alcohols, saccharides and/or carboxylic acids and iodine or bromine.

B. Aqueous iodine-containing gold solvation systems comprising primary or secondary monohydroxy alcohols and ditri- and polyhydric alcohols in the place of or in addition to saccharides and carboxylic acids.

C. Essentially non-aqueous gold solvating systems comprising secondary alcohols and iodine.

Solvation of the gold occurs during agitation and heating of the slurry. The gold contents are removed from the gold pregnant solution by displacement onto a non-noble metal surface. The solid gold containing residue is treated with sufficient aqueous hydroxide solution to convert excess non-noble metal into its water-soluble salt. The remaining insoluble material containing the gold metal recovered is rinsed to remove any remaining unreacted alkali and the soluble salts and is then digested with concentrated sulfuric acid to dissolve any remaining acid soluble impurities, the remaining acid insoluble residue is rinsed, dried and comprises substantially pure gold metal.

18 Claims, No Drawings

PROCESS FOR SEPARATION AND RECOVERY OF GOLD

U.S. Pat. No. 3,576,620 Application Serial No. 727,666, filed May 8, 1968, sets forth a substantially non-aqueous process for separation and recovery of noble metals, particularly gold, platinum and metals of the platinum group from materials containing the same. The process comprises subjecting a slurry obtained by admixing particulate, preferably finely divided, dry material containing noble metals with an iodine-containing ketonic solvent, to heating and agitation to effect the solvation and thus the separation of the noble metals from the other constituents of the material. The liquid phase so derived is acidified and heated to effect volatilization of the iodine by decomposition of iodine-noble metal compounds together with attendant liberation, i.e., precipitation of elemental noble metals due to the decomposition of organic and inorganic noble metal containing compounds. Alternatively, the above application teaches that noble metals may be separated and recovered from materials containing the same by first dissolving noble metals with aqua regia to transform the noble metals present into their respective chloride salts which are then subjected to a ketonic solvent which need not contain iodine. The resultant mixture is then heated to remove excess ketonic material leaving an organic resinous residue containing noble metal inner complex compounds. Acidification and heating result in the decomposition of the organic matter and solvation of the non-noble metal components of the residue, leaving a final residue comprising essentially pure elemental noble metals.

In U.S. Pat. No. 3,709,681 an improvement is disclosed over the compositions and processes to be utilized in the recovery of gold and other noble metals over those set forth in U.S. Pat. No. 3,576,620. The improvements set forth in that application reside in a novel metal solvation process utilizing in its preferred embodiment diacetone alcohol solvent containing not only dissolved iodine, but also a quantity of water, iodides of non-noble metals and acetic acid to yield a solution containing noble metal inner complex ketonic compounds. The noble metals are then recovered in essentially pure state in the form of a sheet or foil by a displacement process involving aluminum foil as set forth in detail in said application.

The present invention relates to compositions and processes of solvation, isolation and recovery of gold in the metallic state from any substance known to contain it. Unlike the applications referred to hereinabove, this invention relates primarily to the recovery of gold and is not particularly concerned with the recovery of any other noble metals. It is an object of this invention to provide new compositions for dissolving and thereafter recovering gold from substances containing same.

It is another object of this invention to devise new processes for dissolving gold and gold metal alloys.

Another object of this invention is to permit the recovery of dissolved gold in pure or relatively pure form as elemental gold.

Another object of this invention is to increase the rate of dissolution of gold.

Another object of this invention is to substantially increase the percentage of gold which can be dissolved and therefore recovered from the gold contents of any gold containing material.

Another object of this invention is to permit the recovery from whatever material may contain the same, gold located within that material, whether the gold be present as a major constituent or whether it be present in no more than trace quantities.

Further objects and aspects of this invention will become apparent in the following discussion.

The present invention contemplates the use of one of the following families of solvent systems for the solvation and recovery of gold:

A. Aqueous Gold Solvation Systems Comprising Primary or Secondary Mono-hydroxy Alcohols, Saccharides and/or Carboxylic Acids and Iodine or Bromine These new compositions of matter are liquids consisting essentially of combinations of saccharides and/or hydroxy carboxylic acids, ethyl alcohol ($C_2H_5OH$), iodine or bromine, and water.

Since alcohol (ethanol) and water are the principal ingredients of this new family of compositions of matter utilized as gold solvating agents, alcoholic beverages such as wine, brandy, rum, whiskey, gin and mixtures thereof would be quite suitable as the sources of both the alcohol and water required in the preparation of the solvents of this invention. However, mainly for reasons of economy, the preferred embodiment of this invention involves the use of industrial grade denatured ethanol, such as, for example SDA Formula No. 1. (100 gallons of ethanol to which have been added 5 gallons of wood alcohol) with water added as required, as will be explained below. It may be pointed out that alcoholic beverages also contain saccharides, carboxylic acids, and higher alcohols in addition to their ethanol and water content. Alcoholic beverages may be used without modification or they may be fortified with ethanol, e.g., by the addition of grain alcohol. Denatured (wood alcohol-containing) industrial ethanol provides excellent gold metal and gold metal alloy solvents suitable for use in practicing this invention.

The saccharide component of the solvent compositions of this invention may be selected from either mono-, di-, or polysaccharides such as, for example, glucose, sucrose (cane or beet sugars), and starch. The hydroxy carboxylic acid component which may be utilized in addition to or instead of the saccharide component may be selected from mono-, di-, and polyhydroxy, monocarboxylic or dicarboxylic acids, such as, for example, glycollic, tartaric, fumaric, malic, succinic, maleic, and gluconic acids. All are suitable and may be satisfactorily employed in the preparation of the disclosed solvents for gold.

The halogen component of the gold dissolving compositions herein disclosed may be either elemental iodine or elemental bromine. However, elemental iodine is deemed to be a preferred embodiment because it has been established that the presence of iodine greatly accelerates the necessary inversion of sucrose, the preferred saccharide. Additionally, its presence greatly enhances concomitant reactions of halogenation, dehydration, rehydration, hydrogenation, condensation, oxidation, and reduction thus resulting in a superior solvent for gold metal. Where saccharides other than sucrose, e.g., invert sugar are used, with or without hydroxy carboxylic acids (e.g., mono-, di-, or polyhydroxy monocarboxylic or di-carboxylic acids), either halogen may be used to provide equally satisfactory gold metal solvents.

The compositions of this invention overcome in a novel and unobvious manner the difficulty inherent in the prior art. Thus, it has previously been disclosed that either iodine or bromine in the presence of their halide salts (such as potassium and sodium iodide) are capable of reacting with metallic gold to form gold halide salts. It should be noted that halide salts as noted above are not used nor is their use recommended in this invention since studies have shown that their presence in the noted new compositions of matter utilized as solvents for gold does not enhance the solvation of gold metal but actually hinders it.

It is also known that the gold content of aqueous gold halide salt systems can be readily reduced to the metallic state in the presence of sugars (saccharides) or di-carboxylic acids (such as oxalic acid). As a practical matter, the tremendous instability of gold halide salts and the strong tendency of the gold ions of such salts in aqueous medium to become reduced to their elemental state contraindicates the using of a composition of matter such as above described as solvents for gold metal.

The mechanism for the solvation of gold utilizing the new compositions of matter disclosed herein may be more readily understood by reference to the series of equations set forth below relating to the preferred embodiment namely the use of a combination of sucrose, elemental iodine, ethyl alcohol, and water:

1. $C_{12}H_{24}O_{12} + C_2H_5OH + I_2 + H_2O \xrightarrow{\text{inversion}} C_6H_{12}O_6 + C_6H_{12}O_6$
   sucrose → glucose + fructose
   $+ HI + HIO + C_2H_5OH$ 2. $C_6H_{12}O_6 \xrightarrow[+H_2O]{\text{hydration}} HOOC-CH_2-CH_2-COOH + CH_3CHO$
   glucose → succinic acid + acetaldehyde
   $+ 2H_2O$ 3. $C_6H_{12}O_6 \xrightarrow[1/2O_2]{\text{oxidation}}$
   glucose
   $HOOC-CH(OH)CH(OH)CH(OH)CH(OH)CH_2OH$
   gluconic acid 4. $C_6H_{12}O_6 \xrightarrow[2O_2]{\text{oxidation}} HOOC-CH(OH)CH(OH)COOH$
   fructose → tartaric acid
   $+ COOH-CH_2OH + H_2O$
   glycollic acid 10. $HOOC-CH(OH)CH_2-COOH + CH_3COOH + H_2$
    malic acid    acetic acid
    $\xrightarrow{\text{condensation}} HOOC-CH_2-C(OH)(COOH)-CH_2-COOH + H_2$
    citric acid The above equations illustrate a few definable reactions which take place within the system, in addition to many others. Additionally, the elemental halogen and the hydrogen halide acid (e.g., HI or HBr) present in the system react across the double bonds of the system's unsaturated organic acids and also displace the hydroxyl groups of the hydroxy carboxylic acids present. This results in the formation of halogenated hydroxylated and halogenated non-hydroxylated mono- and di-carboxylic acid compounds. The foregoing compounds are instrumental in converting gold metal into its iodide form (AuI), an inorganic salt of gold soluble in an ethanol-water system as well as into aurous-iodine- carboxylic acid compounds (organic salts of gold) soluble in the ethanol-water systems of this process, thus effectively accomplishing the solvation of the gold metal. The following equations illustrate the reactions which result in the formation of the halogenated compounds capable of dissolving gold to an acceptable degree of completeness and at an acceptable rate:

11. $HOOC-CH=CH-COOH \xrightarrow{+HI}$
    fumaric and/or maleic acids
    $HOOC-CH(I)-CH_2-COOH$
    iodo-succinic acid 12. $HOOC-CH=CH-COOH \xrightarrow[I_2]{+HI}$
    fumaric and/or maleic acids
    $HOOC-CH(I)-CH(I)-COOH$
    di-iodo-succinic acid 13. $HOOC-CH(OH)CH(OH)-COOH \xrightarrow{I_2}$
    tartaric acid
    $HOOC-C(OH)(I)-CH(I)-COOH + H_2O$
    di-iodo-malic acid The following table demonstrates the indispensable nature of each of the noted system components in achieving the solvation of gold. For purposes of comparison, the quantity of gold exposed to solvation, the particle size and all other relevant conditions were kept constant:

TABLE.— GOLD METAL DISSOLUTION WITH USE OF VARIOUS SOLVENT SYSTEMS

| Solvent system | Saccharide kind | gms. | Carboxylic acid kind | gms. | Iodine, cms. | Alcohol source | ml. | Water, ml. | Gold metal dissolved, mgs. |
|---|---|---|---|---|---|---|---|---|---|
| 1 | sucrose | 50 | | | 30 | | | 500 | 6.5 |
| 2 | invert sugar | 50 | | | 25 | | | 500 | 205 |
| 3 | | | | | 25 | | | 500 | 0.5 |
| 4 | | | tartaric acid | 50 | 30 | | | 250 | 227 |
| 5 | | | | | 25 | grain alc. 190 pf. | 250 | | 205 |
| 6 | | | | | 25 | do | 25 | 500 | 20.5 |
| 7 | | | tartaric acid | 50 | 30 | do | 500 | | 12560 |
| 8 | | | malic acid | 50 | 30 | do | 500 | | 9973 |
| 9 | sucrose | 45 | | | 45 | do | 475 | | 20835 |
| 10 | do | 15 | | | 15 | whiskey 100 pf. | 300 | | 5277 |
| 11 | do | 20 | | | 20 | brandy 80 pf. | 400 | | 5364 |
| 12 | do | 20 | | | 20 | grain alc. 190 pf. | 200 | | 9880 |
| 13 | | | | | 20 | port wine 20% | 400 | | 1002 |
| 14 | sucrose | 5 | | | 20 | do / grain alc. 190 pf. | 200 / 200 | | 3367 |
| 15 | invert sugar | 20 | | | 20 | rum 80 pf. | 400 | | 4716 |

5. $CH_3CHO \xrightarrow[1/2O_2]{\text{oxidation}} CH_3COOH$
   acetaldehyde    acetic acid 6. $2HOOC-CH(OH)CH(OH)-COOH + 2H_2 \xrightarrow[2H_2O+2H_2O]{\text{dehydration}}$
   tartaric acid
   $HOOC-CH=CH-COOH + HOOC-CH=CHCOOH + 2H_2O$
   fumaric acid    maleic acid 7. $HOOC-CH=CH-COOH \xrightarrow[+H_2O]{\text{hydration}}$
   fumaric and/or maleic acids
   $HOOC-CH_2CH(OH)-COOH$
   malic acid 8. $HOOC-CH_2-CH_2-COOH \xrightarrow[-H_2]{\text{dehydrogenation}}$
   succinic acid
   $HOOC-CH=CH-COOH$
   fumaric acid 9. $HOOC-CH(OH)CH_2-COOH + HOOC-CH_2OH$
   malic acid    glycollic acid
   $\xrightarrow{\text{condensation}} HOOC-CH_2-C(OH)(COOH)-CH_2-COOH+H_2O$
   citric acid Referring to the above table, it is readily apparent that the amounts of gold metal dissolved varied from almost none in a system limited to elemental iodine and water to only 6.5 mgs. in the foregoing system additionally containing sucrose. The substitution of inverted sugar for sucrose increased the amount of dissolved gold to 205 mgs. An ethanol-iodine system was capable of dissolving 205 mgs. of gold. The substitution of tartaric acid for the invert sugar in the presence of water and halogen resulted in dissolution of only 227 mgs. of gold. In contrast therewith the use of slightly more iodine and the use of ethanol in conjunction with tartaric acid in the dissolving medium results in the dissolution of 12,560 mgs. of gold. Further inspection of the table shows that the use of alcoholic beverages or grain alcohol (190 proof) in conjunction with sucrose (or invert sugar) and with elemental iodine resulted in the dissolution of remarkable amounts of gold metal. Port wine typically contains approximately 2–3 percent sugar and 20 percent ethyl alcohol as natural constituents. A port wine having the described constituents was used, together with additional sucrose and ethanol, as a gold solvation medium. This composition dissolved three times the amount of gold as compared with the amount of gold dissolved by the same kind of port wine containing the same amount of elemental iodine but not fortified with additional sugar or ethanol. A composition comprising 1 pint of alcohol (95 percent $C_2H_5OH$ — 190 proof), 0.1 pounds of table sugar (sucrose), and 0.1 pound dissolved elemental iodine was capable of dissolving 20,835 mgs. or 0.67 troy ounces of gold metal.

Ethanol is the most effective of the primary or secondary alcohols utilized in the practice of this invention. Thus, while experimental studies have indicated that primary and secondary alcohols such as for example, methanol and isopropanol may be used in substitution for ethanol in conjunction with the presence of elemental halogen and the saccharides or carboxylic acids, the resulting degree of gold metal solvation is limited in amount as compared with the amount dissolved wherein ethanol is used. For example the substitution of methanol for ethanol —all other conditions being kept constant— resulted in the dissolution of only 33 mgs. of the gold sample exposed. Isopropanol resulted in only 27 mgs. of gold metal becoming dissolved. In comparison therewith the use of ethanol in the identical system resulted in the dissolution of 2,062 mgs. of gold metal under the same conditions.

Additional studies have shown that in all ranges of proportion, systems containing all three of the noted principal constituents (i.e., saccharides and/or carboxylic acids, elemental halogens and ethanol), such systems were capable of dissolving many times more gold metal and gold metal alloys than it was possible to dissolve under the same conditions by using any combination of just two of the three named components. Experiments have also established that the use of sucrose or inverted sugar instead of singular carboxylic acids in preparing the solvation systems of this invention produced superior results. It is thought that this is attributable to the reactions of sucrose, or inverted sugar with the elemental halogen and hydrogen halide acid which result in the production of a multiplicity of hydroxy carboxylic acids which are in turn capable of reacting with gold to produce organic salts of gold soluble in the ethanol and water present in the system. The above findings were corroborated by using alcoholic beverages, e.g., port wines as the sources of ethanol and sugar, and using such sugar instead of the singular carboxylic acids.

The presence of water in the new compositions for the solvation of gold not only enhances the over-all reactivities between the three principal components as well as the reactivities of the products of their reactions with gold exposed to such a system, but is also necessary for the formation of hydrogen halide acid and the attendant formation of the water-ethanol soluble inorganic salts of gold, e.g., aurous iodide or bromide as the case may be.

As a preferred embodiment the optimum solvent system should consist of an amount of ethanol sufficient to dissolve the amount of elemental halogen used. For instance, 12.5 ml. of ethanol are required to dissolve 1 gram of $I_2$. Water must be introduced into the system in an amount sufficient to dissolve the amount of the saccharide or carboxylic acids introduced into the system. For example, 0.5 ml of water are required to dissolve one gram of sucrose. The total amount of elemental halogen should be slightly in excess of the stoichiometric requirements to form gold halide as well as the base metal halides of any base metals which may be present. The amount of saccharides or carboxylic acids used should be proportional to the amount of halogen introduced into the system. The range of proportions expressed in parts by weight of saccharide or carboxylic acid to halogen should generally be 1:4 up to 1:1. In any event the solvent system should contain no insoluble matter whatsoever. In accordance with this invention, solvent preparation and gold solvation can occur simultaneously or sequentially.

A quantity of gold metal having a particle size of 60 mesh (U.S. std. sieve sized) was placed into a flask equipped with a water cooled condenser. Equal weights of sucrose and elemental iodine were added to the flask containing the gold particles, followed by the addition of industrial grade ethyl alcohol and water. The flask and its contents were shaken until the sugar and iodine were observed to have dissolved. With the condenser in place, the contents were heated under reflux conditions to a temperature in the vicinity of the boiling point of the mixture and maintained in this heated state until it was evident from visual observation that no undissolved gold particles remained in the flask.

Where the gold containing substance to be processed is a gold bearing ore or gold mineralized substance it is preferable to first prepare the solvent by combining the required amounts of ingredients and heating under reflux conditions as noted above until the condensate is colorless or nearly so (light yellow) indicating that the iodine or other halogen employed has combined chemically with the solution rendering the solution ready for use as a gold solvent. In the case of high content gold mineralized substances, the solvent as prepared above may be used as such to recover gold from mineralized substances having such high gold content, or it may be diluted with increasing amounts of water to process ores with decreasing gold content, as illustrated hereinafter. Thus, in cases of materials having a relatively low gold content, e.g., ores containing gold in amounts between 0.1 to 0.5 troy ounces of gold per ton, the original solvent (concentrate) may be diluted so as to become predominantly aqueous (99.9% $H_2O$), and contain in the range of 100 to 1,000 parts per million of the "concentrated" solvent. For example: a solvent prepared by use of 5 grams of sucrose, 5 grams of elemental iodine, 70 ml. of denatured ethyl alcohol, and 24 ml. of water, all refluxed as noted above will result in a concentrated solvent where each 1 ml. will contain approximately 0.05 grams of iodine in chemical combination with carboxylic acids and ethyl alcohol. One ml. of this solution added to and mixed with one liter of water provides a secondary solvent solution. 200 ml. of this secondary solvent system were combined and intimately mixed at ambient temperature with 200 grams of comminuted gold bearing ore having a gold content of 0.1 to 1.0 troy ounces of gold per ton. After a 15 to 20 minute mixing period the liquid portion containing the dissolved gold (and base metals) was mechanically separated from the insoluble solid matter. The insoluble solid matter was then washed free of entrapped gold pregnant liquid with either water diluted methanol or ethanol (1 part of alcohol to 4–6 parts of water) and the washings were combined with the originally separated gold pregnant liquid to be processed for the isolation and recovery of the gold contained therein by any suitable process. The preferred method involves the displacement of gold utilizing a base metal such as aluminum, copper, iron and zinc as disclosed in U.S. Pat. No. 3,709,681.

The nature of the material to be treated to remove its gold content must be considered in formulating the amounts and relative proportions of system constituents to be used. Thus, when it is desired to dissolve gold metal alloys or to treat ores of gold mineralized substances known to contain base metals in addition to gold, the contents of such base metals present must be taken into consideration relative to the amount of halogen employed in the dissolving agent since such base metals are likewise dissolved by these new compositions of matter used as gold solvents. For example, dissolving a gold metal alloy known to contain 90% gold, 5% silver and 5% copper, the solvent employed must contain at least sufficient halogen to meet the stoichiometric requirements to convert all three metals into their mono-valent halide salts. A slight excess of the halogen employed, —preferably approximately 10 to 20percent more than is known to be required stoichiometrically— will not only assure complete dissolution but will also greatly enhance the time rate of dissolution of the alloy. In addition, such a slight excess of halogen will materially assist in helping retain non-organic gold compounds in solution until it is desired to convert them to elemental gold.

B. Aqueous Iodine-containing Gold Solvation Systems Comprising Primary or Secondary Monohydroxy Alcohols and Di-tri and Polyhdric Alcohols in the Place of or in Addition to Saccharides and Carboxylic Acids Gold solvents of the above-described type differ from those disclosed in the immediately preceding section of this specification in that di- tri-, and polyhydric alcohols are utilized in the place of or in addition to the saccharides and carboxylic acids. In this way it is possible to increase almost three-fold the time rate of dissolution of the gold metal as compared to the solvent systems not containing di-, tri- and polyhydric alcohols.

The liquid primary or secondary mono-hydroxy alcohols useful in preparing solvent systems of this type include, for example; methanol, ethanol, isopropanol, butanol and pentanol, or mixtures of same. The di-, tri-, and polyhydric alcohols useful in practicing this invention include, for example: ethylene and/or propylene glycols, glycerine, erythritol and sorbitol or mixtures thereof, in place of or in addition to the saccharides and carboxylic acids as previously disclosed. The elemental halogen used in the preparation of solvents of this type may be either iodine or bromine.

The element iodine ($I_2$) is the preferred halogen in the preparation of this type of solvent system. One significant reason for the preference is based on the physical properties of iodine, including the fact that it is easily handled. In addition the preference is based on the chemical properties of its compounds which exist in the solvent system at one time or another. These iodine compounds include halogen acids such as HI and $HIO_3$, alkyl halides such as $C_2H_5I$, alkyl halogenated acids such as $CH_2ICOOH$, and alkyl halogenated aldehydes such as $CH_2ICHO$. The foregoing are among the most reactive of halogenated compounds and highly effective gold solvents.

The solvent systems of this type are prepared by combining all of the ingredients and heating the resultant liquid under reflux conditions until colored vapors have nearly disappeared. During the heating step, the system is characterized by the following principal reactions, all of which occur to some degree depending upon the nature and the amount of ingredients used:

1. $C_2H_5OH + I_2 + H_2O \rightarrow CH_3CHO + 2HI + H_2O$

2. $H_2O + I_2 \rightarrow HI + HIO$

3. $3H_2O + 3I_2 \rightarrow 5HI + HIO_3$

4. $2RCOH + HIO_3 \rightarrow 2RCOOH + HIO$

5. $CH_3CHO + I_2 \rightarrow CH_2ICHO + HI$

6. $CH_2ICHO + 2HIO \rightarrow CI_3CHO + 2H_2O$

7. $RCHO + I_2 + H_2O \rightarrow RCOOH + 2HI$

8. $CH_2ICHO + I_2 + H_2O \rightarrow CH_2ICOOH + 2HI$

9. $C_6H_{12}O_6 \text{ (fructose)} + 4I_2 + 3H_2O \rightarrow$
HOOC—CH(OH)—CH(OH)—COOH (tartaric acid) + HOOC—$CH_2OH$ (glycollic acid) + 8HI 10. HOOC—CH(OH)—CH(OH)—COOH (tartaric acid) + HI $\rightarrow$
HOOC—CH(I)—CH(OH)—COOH (mono-iodotartaric acid) + $H_2O$ 11. $4CH_2(OH)CH(OH)CH_2(OH)$ (glycerol) + HI + HIO $\rightarrow$
$2CH_2(I)CH(OH)CH_2(OH)$ (alpha monoiodohydrin) + $CH(O)CH(OH)CH_2(OH)$ (glyceraldehyde) + $CH_2(OH)C(O)CH_2(OH)$ (dihydroxy acetone) + $3H_2O + H_2$ 12. $ROH + HI \rightarrow RI + H_2O$ 13. $\begin{array}{c}CH_2OH \\ | \\ CH_2OH\end{array}$ (ethylene glycol) $+ \frac{1}{2}O_2 \rightarrow \begin{array}{c}CHO \\ | \\ CH_2OH\end{array}$ (glycollic aldehyde); $\begin{array}{c}CHO \\ | \\ CH_2OH\end{array} + \frac{1}{2}O_2 \rightarrow \begin{array}{c}COOH \\ | \\ CH_2OH\end{array}$ (glycollic acid) or $\begin{array}{c}CHO \\ | \\ CHO\end{array}$ (glyoxal) $+ H_2O; \begin{array}{c}CHO \\ | \\ CHO\end{array} + \frac{1}{2}O_2 \rightarrow \begin{array}{c}COOH \\ | \\ CHO\end{array}$ (glyoxalic acid)

14. $\begin{array}{c}CH_2OH \\ | \\ CH_2OH\end{array} + HI \rightarrow \begin{array}{c}CH_2I \\ | \\ CH_2OH\end{array} + H_2O$ 15. $\begin{array}{c}COOH \\ | \\ CH_2OH\end{array} + 2HI \rightarrow \begin{array}{c}CH_2I \\ | \\ CH_2I\end{array} + 2H_2O$ The resultant solution is highly acidic (pH about 2.0) and may be used as a gold solvating agent as such. In another embodiment of this invention aluminum foil is added to the system and the liquid contents are heated to their boiling point or nearly so and held at that temperature until such time as the foam appears to be white or nearly so and the color of the liquid has changed from deeper red to a transparent grey-green color or until it becomes a nearly colorless transparent liquid. After this is observed, the unreacted portion of the aluminum foil used is mechanically removed from the liquid and discarded. The introduction of aluminum metal under the above conditions has the effect of initiating a series of reduction and catalytic reactions which result in the almost total consumption of uncombined water and liberation of hydrogen. The chemistry of the system is characterized by the following equations:

16. $2Al + 5I_2 + 2H_2O \rightarrow 2AlI_3 + 2HIO + 2HI$

17. $2Al + 6HI \rightarrow 2AlI_3 + 3H_2$

18. $2Al + 12HI + 6C_2H_5OH \rightarrow 2AlI_3 + 6C_2H_5I + 6H_2O + 3H_2$

19. $CH_3COOH + CH_2ICOOH + 2H_2 \rightarrow CH_3CHO + CH_2ICHO + 2H_2O$

20. $2AlI_3 + 3ROH \rightarrow Al_2(ORI)_3 + 3HI$

21. $2Al + 6ROH \rightarrow 2Al(OR)_3 + 3H_2$
   aluminum alcoholate

22. $Al(OR)_3 + ROH \rightarrow HAl(OR)_4$
   alkoxy acid

23. $Al(OR)_3 + 3R'COOH \rightarrow (R'COO)_3Al + 3ROH$

24. $Al(OR)_3 + 3HI \rightarrow Al(OH)_3 + 3RI$

25. $Al(OH)_3 + C_4H_6O_5 \rightarrow Al(OH)C_4H_4O_5 + 2H_2O$
   malic acid    aluminomalic acid 26. $Al(OR)_3 + 3H_2O \rightarrow Al(OH)_3 + 3ROH$ 27. $2Al + 3RI \rightarrow R_2AlI + RAlI_2 + CH_3COOH + 2I_2 + 2H_2O$
   alkyl   aluminum   aluminum
   iodide  dialkyl    monoalkyl
           sesquiiodide diiodide 28. 
$$\underset{\text{dihydroxy acetone}}{\begin{array}{c}CH_2OH\\|\\C=O\\|\\CH_2OH\end{array}} \xrightarrow[+4HI]{(CH_3COOH)} \underset{\text{allyl alcohol}}{\begin{array}{c}CH_2OH\\|\\CH\\||\\CH_2\end{array}} + CH_3COOH + 2I_2$$

$+ 2H_2O$

29. $CH_3CHO \xrightarrow{+H_2} CH_2=CHOH$

30. $\begin{array}{c}CH_2OH\\|\\CH_2I\end{array} + HI \rightarrow \begin{array}{c}CH_2I\\|\\CH_2I\end{array} + H_2O$ 31. $CH_3COOH + 2HI \rightarrow CH_3CHO + I_2 + H_2O$ The acidity of the solution resulting from the introduction of aluminum varies from pH 2.0 to pH 1.5, i.e., either slightly less acidic or slightly more acidic than it was prior to the introduction of the aluminum.

After the aluginum has reacted with the solution, additional elemental halogen is then added to the prepared liquid containing the dissolved aluminum and the mixture is subjected to the action of moderate heat. The amount of additional halogen introduced may be roughly on the order of the amount originally introduced. The newly introduced halogen is primarily consumed in halogenation of the organic comounds present along with some esterification. Much of the water remaining is consumed in a combination of oxidation and halogenation reactions while part of the halogen introduced remains in its elemental (chemically uncombined) form. The following reactions are considered to be illustrative of many of the reactions possible in this step:

32. $CH_2ICHO + I_2 \rightarrow CHI_2CHO + HI$

33. $H_2O + I_2 \rightarrow HI + HIO$

34. $2(HOCH_2-CH=CH_2) + 2HIO \rightarrow \begin{array}{cc}CH_2OH & CH_2OH\\|&|\\CHOH & CHI\\|&|\\CH_2I & CH_2OH\end{array}$
alpha and beta monoIodohydrin 35. $2(HOCH_2-CH=CH_2) + HI \rightarrow \begin{array}{cc}CH_2I & CH_2OH\\|&|\\CH & CHI\\||&|\\CH_2 & CH_2I\end{array} + H_2O$ 36. $\begin{array}{c}CHO\\|\\CHO\end{array} + I_2 \rightarrow \begin{array}{c}COOH\\|\\CHI_2\end{array}$ 37. $RCH_2CHO + I_2 + H_2O \rightarrow RCH_2COOH + 2HI$ 38. $RCH_2COOH + I_2 \rightarrow RCHICOOH + HI$ 39. $RCHICOOH + R'OH \rightarrow RCHICOOR' + H_2O$ 40. $(CH_3(CH_2)_3COO)_3Al + 3I_2 \rightarrow 3(CH_3(CH_2)_3COOI) + AlI_3$ 41. $CH_2=CHOH + I_2 \rightarrow CH_3I + CHOI$ 42. $RCH_2CHO + I_2 \rightarrow RCHICHO + HI$ 43. $ROH + HI \rightarrow RI + H_2O$ The total amounts of elemental halogen introduced in preparing solvents must be such in amount that there will be sufficient halogen to meet the stoichiometric requirements of all reactable metals and compounds present in substances to be processed to enable the conversion of such metals to their highest valence states as metallic halides while at the same time leaving some uncombined halogen in solution. In the case of processing gold metal itself there must be sufficient elemental halogen present to meet the stoichiometric requirements shown below:

44. $2Au + 6HI + I_2 \rightarrow 2H_3AuI_4$

If insufficient halogen is present to satisfy the above, a part of the gold metal previously dissolved will revert to metallic state as shown below:

45. $H_3AuI_4 \rightarrow AuI + 3HI$

46. $3AuI \rightarrow AuI_3 + 2Au$

The properly halogenated highly acidic resultant product is now ready for use as a highly concentrated gold metal solvent which may be used as such or which may be diluted with water. Water dilution to an extent as great as 1 part of solvent per 100,000 parts of water by volume will provide a most suitable product for dissolving metallic gold. Several of the principal reactions involved with use of the prepared solvents for dissolving gold metal are illustrated below:

47. $2Au + 6ROH \xrightarrow{I_2 \text{ catalyst}} 2Au(OR)_3 + 3H_2$

48. $H_2 + I_2 \rightarrow 2HI$

49. $Au(OR)_3 + 3HI \rightarrow AU(OH)_3 + 3RI$

50. $Au(OH)_3 + 3RCOOH \rightarrow (RCOO)_3Au + 3H_2O$

51. $Au(OR)_3 + 3R'COOH \rightarrow (R'COO)_3Au + 3ROH$

52. $Au + 3RI \rightarrow R_2AuI + RAuI_2$

53. $2Au + RCHICHO + HI \rightarrow 2AuI + RCH_2CHO$

54. $2Au + RCHICOOH + HI \rightarrow 2AuI + RCH_2COOH$

55. $2Au + HI + HIO \rightarrow 2AuI + H_2O$

56. $AuI + I_2 \rightarrow AuI_3$

57. $2AuI_3 + 2HI \rightarrow 2AuI + 3I_2 + H_2$

58. $AuI + 3HI \rightarrow H_3AuI_4$

59. $6Au + AuI_3 + 3HIO \rightarrow 6AuI + H_3AuO_3$

60. $H_3AuO_3 + 3HI \rightarrow AuI_3 + 3H_2O$

Among the advantages which accrue by reason of the use of this process is the fact that it permits ultimate production of mixtures of highly compatible halogenated organic and inorganic compounds all of which act synergistically and in concert in a rapid and vigorous manner in dissolving gold metal to form combinations of gold organic and gold inorganic compounds all of which are highly soluble in the medium in which they were formed. Additionally all of the gold compounds formed are of such nature that their content of gold ions can be easily converted to elemental gold which can then be mechanically isolated and recovered by simple means to leave residual gold-free liquid compounds which can be re-halogenated for re-use as gold metal solvents having the same gold metal dissolving capacities as they possessed originally. This "regeneration" is possible simply because when the gold metal dissolves in the original solvent it acts in the same manner as the metallic aluminum foil acted when used in preparation of the said original solvent prior to its use as a gold metal solvent.

The gold pregnant solution is then freed of its gold content, preferably by introducing metallic aluminum foil rather than powdered or granular metallic aluminum into such solution for the purpose of converting its content of ionic gold into elemental gold to permit the mechanical removal of the gold as insoluble metal in the form of gold foil in one piece or in several easily recoverable small pieces. The principal reaction mechanism involved in this step are those of replacement and displacement predominantly as shown below:

61. $3AuI + AuI_3 + 2Al \rightarrow 2AlI_3 + 4Au$

62. $(RCOO)_3Au + Al \rightarrow (RCOO)_3Al + Au$

63. $RCHAuCOOH + Al \xrightarrow{+2H_2O} RCH_2CHO + Al(OH)_3 + Au$

64. $6H_3AuI_4 + 8Al \rightarrow 8AlI_3 + 9H_2 + 6Au$

65. $Au(OR)_3 + Al \rightarrow Al(OR)_3 + Au$

66. $Au_2(OR)_3I_3 + 2Al \rightarrow Al_2(OR)_3I_3 + 2Au$

67. $\begin{array}{c} CHAuI \\ | \\ 6CHI \\ | \\ CH_2OH \end{array} + 4Al + 9H_2 \rightarrow \begin{array}{c} CH_3 \\ | \\ 6CH_2 \\ | \\ CH_2OH \end{array} + 4AlI_3 + 6Au$ 68. $\begin{array}{c} COOH \\ | \\ CHAuI \end{array} + Al + 9H_2 \rightarrow 3 \begin{array}{c} CHO \\ | \\ CHO \end{array} AlI_3 + 3Au + 9H_2$ 69. $6CHAuICHO + 2Al \xrightarrow{3H_2} 6CH_2CHO + 2AlI_3 + 6Au$ In formulating the amounts and proportions of the various constituents and reactants in the practice of this invention the requirements include that the amount of water employed at the onset of solvent preparation should be in the range of 10 percent plus or minus 5 percent of the total volume of the solvent. The amount of halogen is regulated by introducing an amount sufficient to meet the previously noted stoichiometric requirement to dissolve the gold and other metals of the material to be processed or can be in excess of such requirements providing the excess halogen that is in the system is capable of remaining dissolved in said system. The amounts of saccharides, carboxylic acids, polyhydric alcohols and related compounds as previously enumerated must be completely soluble in the system. Studies have shown optimal amount by weight to equal to or be slightly greater (10 percent to 20 percent) than the total amounts by weight of halogen used and are between 20 percent to 30 percent by weight of the total weight of the combination of all ingredients used to produce the final undiluted solvent system. The amounts of primary and/or secondary monohydroxy alcohols shown to be optimal lie in the range of 70 percent to 85 percent of the total liquid volumes of the finished product either prepared for use as such or prepared for use with water dilution. The amounts of metallic aluminum metal foil (household type) found to be optimal for both the decolorization step and for the gold displacement step are not critical other than there should be sufficient metallic foil present to achieve the required results as noted previously. Studies have shown that one gram of household aluminum foil will decolorize solvent solutions containing about 20 grams of dissolved halogen and will displace approximately one-third troy ounce of metallic gold from the gold pregnant solutions obtained to leave approximately 25 to 50 percent of the aluminum metal foil originally introduced as residual metal after the completion of either of the main steps of this process.

The following is a group of examples presenting in tabular form the various quantitative aspects of this invention. In each instance the amount of gold metal exposed to solvation was 10.00000 grams of 99.99 percent pure gold with paritcle sizes ranging from 0.125 inch to 0.010 inch. In each instance the gold was exposed to solvation for a period of 1 hour.

TABLE II

| | Saccharides, carboxylic acids, and polyhydric alcohols used, kind & weight in gms. | Monohydroxy alcohol used, kind & vol. in mls. | Water used, mls. | Halogen used, kind – gm. | Aluminum consumed (decolor.) gms. | Gold metal dissolved, mgs. | AuIN troy ozs. dissolvable per pint of solvent |
|---|---|---|---|---|---|---|---|
| 1 | Sucrose–20 gms | 190 Pf. ethanol–75 | 25 | $Br_2$–20 | 0.686 | 8,524 | 1.155 |
| 2 | Tartaric acid–10 gms. + sucrose–10 gms. | Den. ethanol–90 | 10 | $I_2$–25 | .675 | 9,520 | 1.300 |
| 3 | Ethylene glycol–10, +malic acid–10, + sucrose–5 | Den. ethanol–85 | 15 | $I_2$–20 | .640 | 8,846 | 1.200 |
| 4 | Sucrose–20 | Den. ethanol–80 | 20 | $Br_2$–20 | .650 | 7,266 | 0.984 |
| 5 | Sucrose–20 | Den. ethanol–85 | 15 | $Br_2$–20 | .646 | 6,302 | .854 |
| 6 | Invert sugar–20 | Methanol–90 | 10 | $I_2$–20 | .595 | 7,448 | 1.009 |
| 7 | Glucose–10, +glycerol–10 | Methanol–85 | 15 | $Br_2$–20 | .584 | 7,260 | .984 |
| 8 | Sucrose–20 | Isopropanol–85 | 15 | $I_2$–20 | .573 | 7,691 | 1.042 |
| 9 | Sucrose–20 | n-butanol–90 | 10 | $I_2$–20 | .637 | 8,363 | 1.133 |
| 10 | Ethylene glycol–20 | Isoamyl alcohol–85 | 10 | $I_2$–20 | .618 | 8,188 | 1.109 |
| 11 | Ethylene glycol–20 | Den. ethanol–30 + methanol–30 +isopropanol–30. | 10 | $I_2$–20 | .769 | 8,785 | 1.190 |
| 12 | Ethylene glycol–20 | Den. ethanol–80 | 10 | $I_2$–20 | .644 | 8,812 | 1.194 |
| 13 | Ethylene glycol–20 | Den. ethanol–80 | 10 | $Br_2$–20 | .734 | 8,426 | 1.142 |
| 14 | Glycerol–15 | Den. ethanol–75 | 10 | $Br_2$–20 | .641 | 8,010 | 1.085 |
| 15 | Mannitol–20 | Methanol–45 + 2° butanol–45 | 10 | $I_2$–20 | .617 | 8,467 | 1.148 |
| 16 | Molasses–20 (89° Brix) | Den. ethanol–40 + isopropanol–40 | 20 | $Br_2$–20 | .666 | 7,892 | 1.069 |
| 17 | Glycerol–10+ tartaric acid–10 | Methanol–85 | 15 | $I_2$–20 | .641 | 8,018 | 1.086 |
| 18 | Malic acid–20 | Methanol–30 + isopropanol–30 + 2° amyl–30. | 10 | $I_2$–20 | .599 | 9,313 | 1.262 |
| 19 | Propylene glycol–5 + sucrose–5 + erythritol–10. | Den. ethanol–45 + methanol–35 | 20 | $I_2$–20 | .620 | 8,682 | 1.176 |
| 20 | Ethylene glycol–10+glycerol–10 | Den. ethanol–40 + benzyl alcohol–40. | 10 | $Br_2$–20 | .638 | 8,214 | 1.113 |

NOTE: Den. ethanol equivalent to SDA Formula 1 (5 gal. wood alcohol added to every 100 gals. ethyl alcohol) 190 Pf. Ethanol equivalent to Grain alcohol–95% $C_2H_5OH$.

In the practice of this invention it is proposed that the solvents as originally prepared in their so-called "concentrated" form may be used for the dissolution of gold metal per se. In instances where the concentration of gold contained in the gold containing material to be processed is very low, a very dilute form of this solvent may be used. In such instances the gold may be both in physical or in chemical combination with other chemical elements such as for example ionic gold present in compounds such as gold sulfide, gold hydroxide, gold thioglucose, alloys, elemental gold and ionic gold — as either or both may be present in mineralized substances — so called "complexed" and "chelated" gold as present in organic compounds, ionic and colloidal gold as present as adsorbed gold, inorganic or organic salts or as adsorbed by certain clays, activated silica and activated carbon in the form of colloidal particles of micron sized elemental gold, and in inorganic and organic gold compounds which may be present as such or entrained, encased ro occluded in physically bound matter associated with humic acids and the like, e.g., including gums, resins, waxes, and soaps occurring naturally in forest litter, and in certain known marine geological deposits.

These new compositions of matter having utility as gold solvent systems are characterized by their strong acidity, their content of available and chemically reactable halogen, their ability to undergo hydrolysis and ionization, their content of water soluble halogenated and non-halogenated organic compounds, their content of solvents capable of dissolving materials such as gum, resins, and the like. They are further characterized by their gold dissolving capabilities and their liquid state. All these characteristics among others acting in concert allow the solvents to be highly active not only with metallic gold but also with many other metals such as for example copper, silver, zinc, aluminum, and metals alloyed with gold. Additionally, their content of organic alcohols, acids, esters, ketones and aldehydes present as both halogenated and non-halogenated compounds make these solvents capable of dissolving a tremendous host of substances containing gold metal and compounds of gold far beyond those cited above. The solvation is characterized in that the gold content of such solubilized matter joins in chemical union with the compounds of the solvents to permit the quick and ready mechanical separation of such solvents pregnant with gold from unwanted and insoluble detritus. And further, due to the extreme degree of water solubility of all of the components of the vast number of such gold solvents that can be prepared by the use of any of the majority of known water soluble saccharides, carboxylic acids, polyhydric alcohols, and monohydroxy alcohols and because of the nearly infinite range of dilutions of the solvents with water, it is possible to prepare an infinite variety of gold metal solvents possessing a selective and wide variation of reactivities at extremely low costs. The following are examples illustrating some of the embodiments of this invention.

EXAMPLE I

Ten grams of table sugar (sucrose) were dissolved in fifteen ml. of water in a glass flask adapted for use with a water cooled reflux condenser. Ten grams of ethylene glycol, 10 grams of elemental iodine, and 85 ml. of grain alcohol (190 Pf.) were added to the flask containing the sugar solution. A reflux condenser was attached to the flask which was heated until its contents started to boil and the vapors that formed returned to the flask as liquid condensate. Heating of the flask and contents was continued until it was noted that the vapor above the liquid was colorless and that the condensing vapors were a light amber color. The flask and contents were removed from the heat source and allowed to cool to ambient temperature after which the condenser was removed momentarily to permit the addition of household aluminum foil weighing approximately 1 gram. The flask and contents with reattached condenser were again heated until the contents were boiling. The heating was continued until the liquid lost its red coloration and became colorless and transparent after which the flask and contents were allowed to cool to ambient temperature. Ten grams of elemental iodine were added and dissolved in the liquid in the flask to produce the gold metal solvent which was used in the following manner as described in Examples II through V.

EXAMPLE II

In the first example of usage of the solvent prepared as described above an accurately weighed amount of pure gold metal (99.99 percent pure) in the amount of 10 grams of a fineness ranging between 0.010 inch and 0.025 inch were placed in a clean, glass stoppered bottle after which all of the gold solvent prepared other than 1 ml. was placed in the same bottle with the gold. The bottle was stoppered and mechanically shaken for 1 hour at ambient temperature after which the undissolved gold present was mechanically separated from the gold pregnant solution and washed free of gold pregnant liquid with several small portions of grain alcohol, then dried, heated to red heat, and weighed. The weight of recovered, isolated, insoluble gold metal whose chemical purity was determined to be equivalent to that of the original gold metal exposed to treatment with the gold solvent was 0.82462 grams.

EXAMPLE III

A piece of household aluminum foil (approximately 2 inches × 6 inches in size and weighing approximately 1 gram was added to the isolated gold pregnant solution (from above) after which the liquid with foil was heated to and held in a temperature range of 130°–150°F. to accelerate displacement of the gold from its solution which required approximately 1 hour of time. When it was noted that the liquid containing the aluminum foil had become colorless it was separated mechanically from the insoluble solid matter present and reserved for re-halogenation and re-use. The insoluble solid matter present (gold foil) was washed free of mother liquor with small portions of grain alcohol with the washings being combined with the previously separated gold-free mother liquor. The insoluble solid matter recovered was freed of alcohol by being gently heated to effect volatilization of such alcohol after which the insoluble matter was digested with 10 ml. of an aqueous solution of nitric acid (approximately 35% $HNO_3$) to effect dissolution of the residual aluminum foil. The nitric acid insoluble matter was mechanically separated from the nitric acid-aluminum nitrate solution and washed with distilled water to free it of any slat and acid contaminants. The insoluble matter was then dried, heated to red heat, cooled, and weighed. The weight of recovered nitric acid insoluble matter whose chemical composition was shown to be 99.97% Au was 9.17538 grams. Thus the solvent dissolved 91.73% of the gold metal processed therewith.

EXAMPLE IV

In the second example of usage of the concerned solvent, the 1 ml. of solvent reserved (as noted above) was diluted with water to a volume of 250 mls. and this aqueous solution was placed in a stoppered bottle with 296.7 grams (representative of a 10 assay ton sample of ore) of a gold-bearing pulverized ore known by fire assay analysis to contain 0.90 troy ounce of gold per ton of ore, or containing the equivalent of 0.90 mgs. Au per 29.67 grams of ore. The bottle with contents was mechanically shaken for a time period of one hour after which the insoluble solid portion was mechanically separated from the liquid portion and washed free of any occluded liquid which was combined with the originally isolated mother liquor. The insoluble solid residue was discarded. A piece of household aluminum foil (approximately 2 inches × 2 inches and weighing approximately one-third gram) was placed in the isolated liquid which was then heated to and held in a temperature range of 100°–125°F. until the liquid became colorless. The aluminum foil in one piece was removed from the liquid which was discarded. The aluminum foil was washed with distilled water, placed in a glass beaker and treated with aqueous nitric acid solution (approximately 30% $HNO_3$) and digested to complete dissolution of the aluminum foil. The acid insoluble residue was mechanically separated from the nitric acid solution and washed free of acid and soluble nitrate salts with water after which it was dried, heated to red heat, cooled, and weighed. The weight of recovered nitric acid insoluble solid matter was 0.01014 grams and by chemical analysis was shown to consist of a combination of 84.71% Au and 15.09% silica ($SiO_2$), and 0.20% unidentified matter. 84.71% gold (Au) represents the equivalent of 0.00859 grams of gold per se to represent solvation and recovery of 95.44% of the Au content known by fire assay analysis.

EXAMPLE V

In the third example of usage of the solvent prepared as described above, after the original solvent was used in the first example and stripped of its gold, it was reserved. In this example this reserved solution was used as follows: Five grams of elemental iodine were added to and dissolved in the previously used and recovered solvent. In turn this re-halogenated solvent was used in an identical manner as the predecessor was used in the first example cited above except that 5 grams of pure gold metal (99.99% Au) were processed. The weight of undissolved gold metal was found to be 0.00551 grams, while the weight of dissolved and recovered gold was 4.99406 grams which represents 99.89% of the gold metal processed. After the gold had been stripped from this solution by use of aluminum metal foil as previously described and the gold-free solution had been separated from the gold and residual aluminum, this solution was re-used after adding and dissolving five grams of elemental iodine in the solution for treating a gold alloy. This gold alloy consisted of one piece of metal having a weight of 7.20122 grams consisting of a gold content of 91.66% Au, a silver content of 4.16% Ag, and a copper content of 4.18% Cu. The alloy and the solvent were shaken for a time period of 1 hour after which the undissolved piece of alloy was removed, washed free of solvent, dried, and weighed to show a weight loss of 0.79487 grams. The solution was processed in the same manner as were the previously processed gold pregnant solutions in the above examples and the amount of gold recovered as metal and determined to be 99.98% pure Au was 0.72820 grams which represents about 99.95% of the weight of gold present in the portion of the alloy that was dissolved by the solvent employed in the processing.

C. Essentially Non-Aqueous Gold Solvating Systems Comprising Secondary Alcohols and Iodine This family of gold solvation agents is particularly adapted for treating gold bearing sedimentary rocks composed primarily of limestone and sandstone containing both organic and inorganic compounds of gold in addition to very finely divided elemental gold in combination with activated carbon and silica, to effect the solvation and recovery of the gold content of same.

The sedimentary rock referred to above is obtainable from the extensive deposits of known gold bearing calcareous-carbonaceous rock. These calcareous-carbonaceous gold bearing ores may be treated with the solvents of this group whose primary purpose is to both dissolve and hold in the solution the organic and inorganic compounds present in these types of ores while simultaneously converting the content of the ores into organic and inorganic gold compounds which are similarly soluble in the same liquid medium. After dissolution of the gold present in the gold bearing material the gold pregnant liquid phase may be isolated mechanically from the unwanted, gold-free insoluble solid phase which is discarded. The isolated, gold-pregnant liquid may be treated for removal and recovery of its content of gold in the form of elemental gold. Thereafter the gold freed liquid may be re-employed in processing of similar types of gold-containing ores.

This class of gold solvents is uniquely adapted to overcome certain problems inherent in and imposed by the nature of the materials sought to be processed and the state of the gold therein contained. The principal problem involves the fact that the gold content of such gold bearing ores may be in chemical combination with various organic acids and hydroxy-compounds, such compounds including sulfur-containing types as well as the those not containing sulfur. The gold may also be in combination with other organic or inorganic compounds. Additionally, gold may be present in elemental form, adsorbed on polar silica and on non-polar carbon. Heretofore it has been impossible to achieve the separation, isolation and recovery of all or even a major portion of the gold contained by such ores by the use of any known processes. Large amounts of lime and alkali present in these ores cause such ores to exhibit high alkalinities upon exposure to water treatment. For example, one part by weight of a typical ore diluted with ten parts of water in a system measured a pH greater than 9. Furthermore, water treatment causes the formation of alkali stabilized hydrophilic and hydrophobic colloid sols which do not lend themselves to treatment by any known process for removal and recovery of their total gold contents. Another problem is posed by the fact that the organic matter present in addition to activated carbon and activated silica causes such ores to exhibit not only great readiness for reduction but also high adsorptive capacity, rendering conventional processing such as by cyanidation completely useless for recovery of more than small percentages of the gold contained by such ores.

The above problems are overcome by employing the solvent systems of this invention which may be characterized as non-aqueous and which by their chemical nature are adapted to hold in solution iodine which is capable of chemically reacting with elemental gold. Furthermore, the non-aqueous solvents herein proposed are capable of displaying properties of both a polar and non-polar solvent. Such solvents are not only capable of "wetting" the surfaces of both the polar silica and the non-polar carbon present in the ore, but also, during the process of such wetting their content of elemental and ionic iodine is brought into intimate contact with the absorbed gold and gold compounds on the surfaces of the silica and the carbon, permitting combined chemical and physical reactions to take place enabling the removal of both gold and gold compounds from the concerned surfaces in solubilized form. Additionally, such non-aqueous solvents are capable of dissolving gums, waxes, fats, resins and the like present in the ores to free any gold that they might contain thereby allowing the iodine and iodine compounds present to effect the solvation of such gold into soluble gold iodine salts. Further, such solvents are capable of holding in solution all of the gold compounds thus formed as the products of the reactions between the iodine and iodine compounds of the solvent and the gold compounds present in the ore naturally.

The principal compound of the solvents of this invention comprises secondary aliphatic alcohols such as for example isopropanol containing a quantity of dissolved elemental iodine. The process involves essentially intimately admixing a gold-bearing material such as mine run ore which has been ground to a fineness of approximately 90 percent minus 200 mesh U.S. Standard sieve size or finer to the action of the solvent. During the exposure the pulverized ore is mechanically agitated for a time period ranging between 2 to 3 hours and thereafter the liquid phase is mechanically separated from the insoluble solids. The remaining solids are washed free of the gold-pregnant alcohol-iodine solution with small portions of additional secondary alcohol containing trace amounts (0.01% to 0.001%) of dissolved elemental iodine. The washings obtained are combined with the main body of previously separated gold-pregnant solution. These gold pregnant solutions may then be processed as will be fully described below to separate and recover their contents of gold from the solvent system comprising iodine and secondary alcohol.

It has been found that gold recovery can be greatly enhanced by subjecting the mine run ore after it has been pulverized to fineness (where 90 percent or more is minus 200 mesh U.S. Standard Sieve size) to moderate heating to a dull red heat in the range of 450° – 600° C. The function of the temperature is for the primary purpose of removing both free water (moisture) and bound water (water of hydration). Such heat treatment appears to permit the exposure of far greater numbers of dehydrated crystal faces of silica to the physical wetting and chemical combination when brought into contact with the secondary alcohol-iodine solutions thus enhancing the degree of recovery. At the same time, deactivation of both the activated silica and the activated carbon appears to take place with the removal of bound hydroxyl groups, reducing and almost eliminating the tendency of these compounds of the ore to form either lyophilic or lyophobic colloid sols upon exposure to the iodine-secondary alcohol solvent while at the same time permitting a combination of physical solvation and chemical reaction to take place with the gold and gold compounds present on the hydroxyl-free crystal faces of silica and carbon. The relatively low temperature of heating of the pulverized ore prevents the occurrence of physical or chemical loss of elemental gold or gold compounds such as would occur in the case of high temperature calcination processing. Some degree of oxidation does occur during the mild heating but such oxidation does not adversely affect the later dissolution and removal of the elemental gold and gold compounds present in the ore so processed. It is therefore unnecessary to provide a special atmosphere and the heating may be carried out under normal atmospheric conditions.

After the ore has been heat processed and cooled to ambient temperature it is ready for processing with the secondary alcohol-iodine solution in the same manner as was described above for processing the mine-run, non-heat treated ore. In this connection it may be noted that the non-heat treated pulverized ore permits a recovery of approximately 80 percent of the total gold content of the ore while the heat treating step makes it possible to recover essentially all of the gold contained by these types of ores.

The use of elemental iodine is the preferred embodiment over the use of any other halogens such as bromine or chlorine. The choice of alcohol to be used in this process is critical. It has been found that the normal aliphatic alcohols such as e.g., methyl, ethyl, propyl, butyl, and amyl having a content of elemental iodine of the same order as employed with secondary alcohols such as isopropanol exert solvation power which increased with the number of carbons in their chains up to n-butanol after which decreased solvation was noted to occur. However, in no case was any singular primary alcohol or any mixture of such containing dissolved halogen — whether elemental iodine or any other halogen — capable of dissolving more than approximately 25 percent of the gold determined by chemical analysis to be present in the ore processed. However, solvent systems comprising secondary aliphatic alcohols such as isopropanol, secondary butanol, and secondary amyl alcohols, whether used singularly or in admixture, and regardless of which of the halogens (e.g., iodine, bromine, or chlorine) were present in solution were found to have greater dissolving power than solvents based upon the primary aliphatic alcohols. Of the secondary aliphatic alcohols tested, the tests indicated that isopropanol was the most suitable in the preparation of iodine containing solvent systems for dissolving the major portions and in some cases all of the gold and the gold compounds present in the ores processed with such. Additionally, isopropanol is readily available as an anhydrous alcohol at reasonable cost and has the lowest boiling point (82.4° C.) of any of the secondary aliphatic alcohols as well as having the highest evaporation rate of these alcohols thus permitting its ready recovery by volatilization. Thus, the use of isopropanol is noted as the preferred embodiment of this process over the use of any other secondary aliphatic alcohol either singularly or in admixture with other secondary alcohols.

The amount of elemental iodine found to be optimal for use in processing these type ores was determined to be in the range between three and five pounds of $I_2$ per each ton of ore processed. The amount of isopropanol (anhydrus) found to be optimal for use in this process was determined to be in the range of 180 to 200 gallons per each ton of ore under processing. However, since this process permits recovery of practically all of the isopropanol introduced and the major portion of elemental iodine used, the amount of either of these chemicals employed is not critical beyond the requirements that there should be sufficient isopropanol present so that the ore under processing is completely "wetted." Furthermore, the resultant ore-alcohol system should be of such viscosity as to permit its being easily and completely mixed by the use of conventional mixing equipment. A rule of thumb formula for a suitable system is the combination of approximately equal parts by volume of isopropanol containing the dissolved iodine and of pulverized ore of a fineness as previously designated. There should be sufficient elemental iodine dissolved in the isopropanol used to insure ample iodine for reaction with gold and the gold compounds of the ore, plus a slight excess.

The amount of iodine required to be used can be most easily ascertained by processing sample lots of the ore concerned with portions of isopropanol, each portion containing varying amounts of elemental iodine to pinpoint optimums. Experimental studies of several ores have shown that, without exception they all were freed of more than 95 percent of their chemically ascertained content of gold by use of amounts of isopropanol and elemental iodine dissolved in 180 gallons of isopropanol for processing one ton (2,000 lbs.) of ore. The following is a classic example of the use of this family of gold solvents.

EXAMPLE VI 296.7 grams of a pulverized (90 percent — 200 mesh) calcareous-carbonaceous gold-bearing ore showing a gold content as Au of 15.2 P.P.M. by atomic adsorption assay methods after first being heated to a temperature of 600° C. then cooled was mixed for a two hour time period by stirring with 250 mls. of anhydrous isopropanol containing 0.6 grams of dissolved elemental iodine ($I_2$). After the mixing was done the resultant mixture was filtered and the insoluble solid residue was washed on the filter with small portions (10–20 mls.) of anhydrous isopropanol containing 0.005 grams of dissolved elemental iodine per each 100 mls. of the alcohol. The filtrate and combined washings were heated to cause almost total evaporation of the isopropanol which was caught as a liquid condensate and reserved for re-use. The non-volatilized residue almost completely free of isopropanol was combined with about 50 mls. of water and heated to boiling after which a piece of household aluminum foil weighing approximately 0.5 grams was added. The aqueous solution with the aluminum foil was heated further until the solution became colorless and its content of gold became attached to the foil. which was then removed from the gold-free aqueous solution. The aqueous solution, after evaporation of its water left a residue that upon acidification with a small quantity of concentrated sulfuric acid effected the liberation of its iodine from the iodide salts present to leave as a collectible sublimate of elemental iodine reserved for re-use. The aluminum foil with its deposit of gold was dissolved by use of an aqueous solution of nitric acid (approximately 30% $HNO_3$) to leave a residue of insoluble, elemental gold metal which was mechanically isolated by filtration, washed free of acid and nitrate salts, dried, ignited to red heat, cooled, and weighed to show a weight of 4.62 mgs. whose chemical analysis showed it to contain 4.35 mgs. of gold representing 4.35/4.41 or 98.65 percent of the gold shown to be present in the amount of ore processed.

EXAMPLE VII

A second sample of ore in the same amount as used above was treated in identical manner in-as-far as removing the gold from the ore by use of the isopropanol-containing iodine solvent. However, instead of displacing the gold with aluminum as described above, the residue obtained from vaporization of the isopropanol was treated directly with a small amount of concentrated sulfuric acid (98.5% $H_2SO_4$) to cause decomposition of the iodine compounds and liberation of crystals of sublimed iodine which was trapped for re-use. Next, the iodine-free acid system was heated as is conventionally done in the parting of silver and other base metals from gold metal to free it of any contaminants after which the isolated gold metal was heated to redness, cooled, and weighed to show a weight of 4.88 mgs. of which 89.95% was gold metal (4.39 mgs.) representing a recovery of 99.55% of the gold previously shown to be present in the ore processed. The contaminating 10.04% present was found to be silica ($SiO_2$) whose removal was effected by treating the residue with hydrofluoric acid.

What is claimed as new is as follows:

1. A process for the separation and recovery of gold and/or compounds of gold from substances containing same, which comprises:
   a. finely dividing said gold or gold-compound containing substance;
   b. subjecting said finely divided gold or gold compound containing substance by intimately admixing said substance with a gold solvation system consisting essentially of:
      i. at least the stoichiometric quantity of dissolved elemental halogen relative to the gold to be solubilized, said halogen being selected from the group consisting of iodine, bromine and mixtures thereof;
      ii. at least sufficient alcohols selected from the group consisting of primary and secondary mono-hydroxy alcohols to solubilize the halogen present;
      iii. a quantity of dissolved organic compounds relative to halogen in the range, by weight, from about 1:4 to 1:1, said dissolved organic compounds being selected from the group consisting of saccharides, hydroxy carboxylic acids, di- and polyhydric alcohols and mixtures thereof; and
      iv. at least sufficient water to solubilize the quantity of said dissolved organic compounds present; to form a gold-pregnant solution comprising dissolved gold compounds and an insoluble residue substantially free of gold;
   c. separating said gold-pregnant solution from said insoluble residue;
   d. recovering the gold content from the said gold-pregnant solution.

2. The process of claim 1 wherein the said dissolved organic compound is a polyhydric alcohol.

3. The process of claim 1 wherein the saccharide utilized in the said solvent is sucrose.

4. The process of claim 1 wherein the halogen utilized in the said solvent is iodine.

5. The process of claim 1 wherein at least a portion of the water, primary and secondary mono-hydroxy alcohols, saccharides and carboxylic acids are supplied by an alcoholic beverage selected from the group of distilled alcoholic beverages, undistilled alcoholic beverage ferments and mixtures thereof.

6. The process of claim 5 wherein the solvent is additionally fortified with ethanol and sucrose.

7. The process of claim 1 wherein the saccharides are selected from the group consisting of mono-, di- and polysaccharides and mixtures thereof.

8. The process of claim 1 wherein the carboxylic acids are selected from the group consisting of mono- di- and polyhydroxy mono and dicarboxylic acids and mixtures thereof.

9. The process of claim 1 wherein said solubilizing step includes agitating said solvent.

10. The process of claim 1 wherein said halogen does not exceed an excess of 20 percent over the stoichiometric requirements.

11. The process of claim 1 wherein the said solvent is prepared by dissolving the noted ingredients and heating same under reflux until the liquid condensate is slightly yellow indicating that the halogen employed has combined chemically with the solution.

12. The process of claim 1 wherein the process for recovering the gold content of the said gold pregnant solution comprises:
   a. placing a quantity of non-noble metal selected from the group consisting of: silver, copper, iron, zinc and aluminum into the said gold-pregnant solution,
   b. heating the said solution until the gold contents have become substantially displaced from the solution and are found adhering to the non-noble metal or as a free metal on the bottom of the vessel employed, and
   c. removing the solvent freed of its gold contents leaving a solid gold containing residue.

13. The process of claim 12 wherein the non-noble metal employed for displacement of the noble metal is aluminum in sheet form.

14. The process of claim 12 wherein the solvent which has been freed of its contents of noble metal is thereafter fortified with elemental iodine and is adapted to be re-used for solvation of gold from substances containing same.

15. The process of claim 12 wherein the solid gold containing residue, after being separated from the solvent, is thereafter sequentially subjected to the following steps:
   a. washing free of any remaining gold pregnant solution with a fresh portion of solvent,
   b. moderate heating to volatilize residual solvent,
   c. treating with aqueous nitric acid solution to dissolve the non-noble metal residue,
   d. separating said nitric acid insoluble gold metal residue, and
   e. rinsing said gold metal residue with water to remove contaminates therefrom.

16. A process for the separation and recovery of gold and/or compounds of gold from particulate materials containing the same which comprises intimately admixing a particulate material containing gold and/or gold compounds with an essentially non-aqueous gold solvation system, said system consisting essentially of an aliphatic secondary alcohol solution containing at least the stoichiometric quantity of dissolved elemental iodine to dissolve the gold and/or gold compounds from said material into said solution; separating said solution from said material; and recovering the gold content from said solution.

17. The process of claim 16 wherein the said alcohol is isopropanol.

18. The process of claim 16 which includes the step of subjecting mine run ore after it has been pulverized to a fineness where 90 percent or more is minus 200 mesh U.S. standard sieve size to moderate heating to a dull red heat in the range of 450° C. to 600° C.

* * * * *